United States Patent [19]
Yamada

[11] Patent Number: 6,082,319
[45] Date of Patent: Jul. 4, 2000

[54] PISTON FOR INTERNAL-COMBUSTION ENGINE AND METHOD FOR MANUFACTURE THEREOF

[75] Inventor: Yoshihiro Yamada, Kanagawa, Japan

[73] Assignee: Unisia Jecs Corporation, Atsugi, Japan

[21] Appl. No.: 09/101,202

[22] PCT Filed: Nov. 4, 1997

[86] PCT No.: PCT/JP97/04002

§ 371 Date: Aug. 5, 1998

§ 102(e) Date: Aug. 5, 1998

[87] PCT Pub. No.: WO98/27328

PCT Pub. Date: Jun. 25, 1998

[30] Foreign Application Priority Data

Nov. 5, 1996 [JP] Japan ..................................... 8-310214

[51] Int. Cl.$^7$ ...................................................... F02F 75/06
[52] U.S. Cl. ............................................................ 123/193.6
[58] Field of Search ........................... 123/193.6; 92/222, 92/223; 29/888.049

[56] References Cited

U.S. PATENT DOCUMENTS 5,653,021  8/1997  Matsuyama et al. ............... 29/888.049
5,671,710  9/1997  Sasaki ................................... 123/193.6

*Primary Examiner*—Marguerite McMahon
*Attorney, Agent, or Firm*—Foley & Lardner

[57] ABSTRACT

A piston 1 made of an aluminum alloy was cast in a manner to enclose a ringlike member 6 of a three-layer structure having aluminum alloy materials 8 disposed on both sides of a copper alloy material 7, at a piston's peripheral portion 2 forming thereon piston ring grooves 3 of the piston 1. The ringlike member 6 and the piston 1 are monolithically bonded together by a local remelting of the aluminum alloy material 8 of the ringlike member 6 and the piston 1 at a bonded portion thereof. Then, a piston ring groove 3 was formed on the copper alloy material 7 of the ringlike member 6. With this, it is possible to obtain an internal-combustion engine's piston that does not have adhesion of a hardened layer portion forming thereon a piston ring, to the piston ring, and does not have cracks on the hardened layer.

7 Claims, 3 Drawing Sheets

1 · · · Piston for Internal Combustion Engine
2 · · · Peripheral Portion
3 · · · Top Ring Groove (Piston Ring Groove)
6 · · · Ringlike Member 1 · · · Piston for Internal Combustion Engine
2 · · · Peripheral Portion
3 · · · Top Ring Groove (Piston Ring Groove)
6 · · · Ringlike Member 7 · · · Copper Alloy Material
8 · · · Aluminum Alloy Material

PISTON FOR INTERNAL-COMBUSTION ENGINE AND METHOD FOR MANUFACTURE THEREOF

TECHNICAL FIELD

The present invention relates, for example, to a piston of an automotive internal-combustion engine, particularly to a piston provided with a piston ring groove that is superior in adhesion to the piston ring and in abrasion resistance, and relates to a method for producing the same.

BACKGROUND TECHNOLOGY

A piston for internal-combustion engine is generally made of aluminum alloy, and its peripheral portion is formed with a plurality of piston ring grooves. A piston ring is fitted in this piston ring groove. Of the piston ring grooves, the top ring groove, in which the top ring positioned nearest to the crown surface is fitted, tends to have abrasion on its inner surface, because of the reasons that the temperature is high due to its close position to the combustion chamber and that the top ring receives the combustion pressure, and because of other reasons.

As a countermeasure against this, Japanese Patent Laid-open Publication 2-125952 proposes an aluminum alloy piston prepared by forming a peripheral groove on a peripheral portion forming thereon a piston ring groove, then by fitting into the peripheral groove a copper wire material wound thereon, and then by locally melting the copper wire material and its neighboring piston base material by electron beam, then by allowing the melted copper to diffuse into the piston base material, thereby to form an abrasion-resistant hardened layer made of an alloy of aluminum alloy and copper, having a copper content of 10–35 wt %, and then by forming the piston ring groove on the hardened layer.

According to the above-mentioned conventional example, however, the area of the primary crystal layer is large in a hardened layer's region which has a small copper content. Therefore, it tends to adhere to a cast-iron piston ring during the driving of the internal-combustion engine. Furthermore, the amount of an intermetallic compound of aluminum alloy and copper becomes large in a region having a large copper content. Thus, the hardened layer may have cracks due to thermal stress after the electron beam irradiation.

As a countermeasure against this, it is supposed to melt only a bonded portion between a piston base material and a composite material formed from a copper-containing powder compact, in place of the copper wire material, and to form a piston ring groove on the composite material as the hardened layer superior in abrasion resistance. In this case, however, a low-melting-point binder powder of the powder compact vaporizes by the electron beam irradiation. Therefore, it is difficult to conduct a melt adhesion between the piston base material and the composite material, and thus it can not be adopted offhand.

The present invention was made in view of the above-mentioned problems of conventional technologies. Its object is to provide a piston for internal-combustion engine, having a piston ring groove superior in abrasion resistance, and a method for producing the same, without having adhesion of a hardened layer portion, which forms thereon a piston ring, to the piston ring, and without having cracks on the hardened layer.

DISCLOSURE OF THE INVENTION

According to a piston for internal-combustion engine of the invention, a ringlike member of a three-layer structure having aluminum alloy materials disposed on the both sides of a copper alloy material has been embedded in a peripheral portion forming thereon a piston ring groove of an aluminum alloy piston. Furthermore, a remelting portion has been formed at a bonded portion between the aluminum alloy material of this ringlike member and the piston, and thus the ringlike member and the piston has been bonded together monolithically. Still furthermore, the piston ring groove has been formed on the copper alloy material of the ringlike material.

Furthermore, according to the invention, the copper alloy material of the ringlike material was formed by an aluminum bronze material.

Furthermore, as the copper alloy material of the ringlike member, a composite material was formed from a powder compact prepared by adding 10–15 wt % of silicon carbide and 15–20 wt % of aluminum bronze to a binder powder of silicon and aluminum.

Still furthermore, the ringlike member is heated at a certain predetermined temperature and pressurized at a certain predetermined pressure, and thus there is a metal bond between the copper alloy material and the aluminum alloy material of the ringlike member.

According to the invention, a ringlike member of a three-layer structure having aluminum alloy materials disposed on both sides of an iron alloy material has been embedded in a peripheral portion forming thereon a piston ring groove of an aluminum alloy piston. Furthermore, a remelting portion has been formed at a bonded portion between the aluminum alloy material of this ringlike member and the piston, and thus the ringlike member and the piston have been bonded together monolithically. Still furthermore, the piston ring groove has been formed on the iron alloy material of the ringlike material.

A method for producing a piston according to the invention comprises a first step of casting a piston in a manner to enclose a ringlike member of a three-layer structure having aluminum alloy materials disposed on both sides of a copper alloy material, at a peripheral portion forming thereon piston ring grooves of the piston made of aluminum alloy; a second step of monolithically bonding the ringlike member and the piston together by a local remelting of the aluminum alloy material of this ringlike member and the piston at their bonded portion; and a third step of forming a piston ring groove on the copper alloy material of the ringlike member.

Furthermore, the local remelting at the bonded portion between the aluminum alloy material of the ringlike member and the piston base material is conducted by the electron beam irradiation in a vacuum atmosphere. The electron beam may be replaced with laser beam. In this case, the operation in the atmosphere becomes possible.

Herein, the bonded portion between the aluminum alloy material of the ringlike member and the piston base material is rapidly cooled down by the piston base material after the electron beam irradiation, that is, after the passage of the electron beam. However, since a brittle alloy layer is not formed on the bonded portion between the aluminum alloy material of the ringlike member and the piston base material, no cracks occur thereon.

After that, the outer shape of the piston is formed, and the piston ring groove is formed on the copper or iron alloy material portion as the hardened layer of the ringlike member which is superior in abrasion resistance.

Due to this, according to the invention, there is obtained a piston for internal-combustion engine that is capable of forming thereon a piston ring groove superior in abrasion resistance, without having adhesion of the hardened layer having the piston ring groove formed thereon, that is, the copper alloy material portion of the ringlike member, to a piston ring, and without having cracks on the copper or iron alloy material portion as the hardened layer.

BEST MODE FOR CARRYING OUT THE INVENTION

In the following, the best mode for carrying out the present invention will be described in detail, based on the drawings.

Figure 1A:
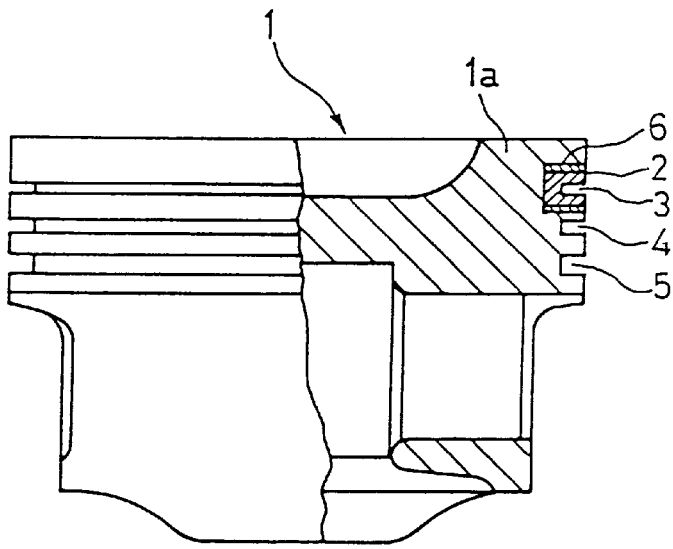
FIG. 1a is a sectional view showing an essential portion of a piston for internal-combustion engine according to an embodiment of the present invention.
Figure 1B:
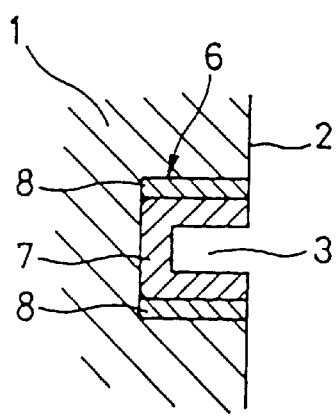
FIG. 1b is an enlarged sectional view showing a piston ring groove of the piston.

FIG. 1a is a sectional view showing an essential portion of a piston for internal-combustion engine according to an embodiment of the present invention, and FIG. 1b is an enlarged sectional view showing a piston ring groove of the piston. In the drawings, designated by numeral 1 is a piston for internal-combustion engine. This piston 1 is made of a high silicon aluminum alloy material (e.g., JIS AC8A material). A peripheral portion 2 of a crown portion 1a of this piston 1 is formed with a plurality of piston ring grooves, that is, a top ring groove 3, a second ring groove 4, and an oil ring groove 5.

Of the piston ring grooves 3, 4 and 5, the top ring groove 3 is formed on the ringlike member 6 embedded in the peripheral portion 2 forming thereon the piston ring groove 3. In detail, the ringlike member 6 is formed of a three-layer structure having aluminum alloy materials 8 disposed on both sides of a copper alloy material, and the top ring groove 3 is formed on the copper alloy material portion 7 of the ringlike plate member 6.

The above-mentioned piston is formed, as follows.

Figure 2:
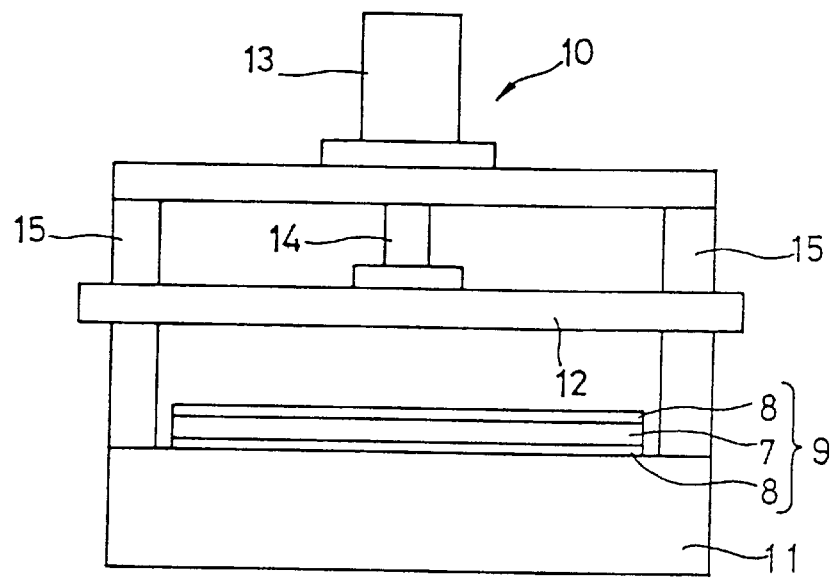
FIG. 2 is an explanatory view of a press.

At first, a process for forming the ringlike member 6 will be explained. That is, a blank material 9 having plate-like aluminum alloy materials 8 disposed on both sides of a plate-like copper alloy material 7 is heated at a temperature that is somewhat higher than the recrystallization temperature of the aluminum alloy material 8 in a furnace not shown in the drawings. Furthermore, it is interposed between an immobile board 11 and a mobile board 12 of a press 10 shown in FIG. 2 and pressurized at a certain predetermined pressure. With this, the three plate members of the copper alloy material 7 and the aluminum alloy materials 8 of the blank material 9 are united into a monolithic body by metallic bond through diffusion. In FIG. 2, designated by numerals 13, 14 and 15 are a cylinder device, a ram, and a column, respectively.

Figure 3:
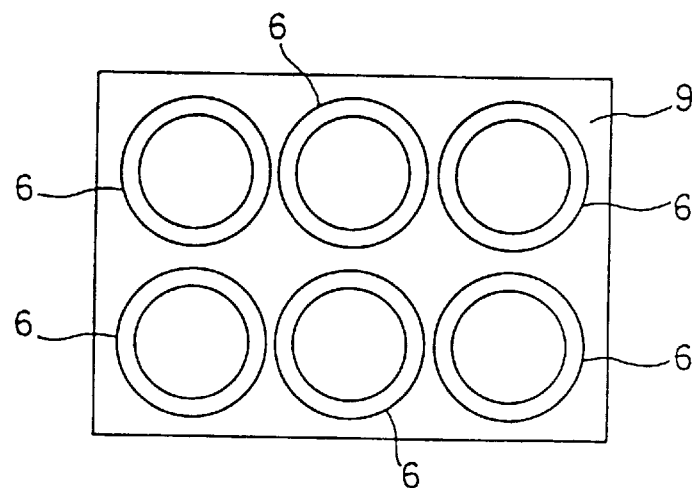
FIG. 3 is an explanatory view showing that a ringlike member is obtained from a blank material.
Figure 4:
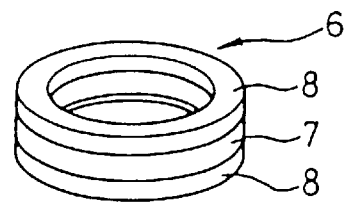
FIG. 4 is a perspective view showing the ringlike member.

Then, as shown in FIG. 3, the blank material 8 is blanked out with a press or the like, thereby to obtain the ringlike member 6 having a three-layer structure as shown in FIG. 4.

In the following, a process for molding the piston 1 by casting will be explained.

Figure 5:
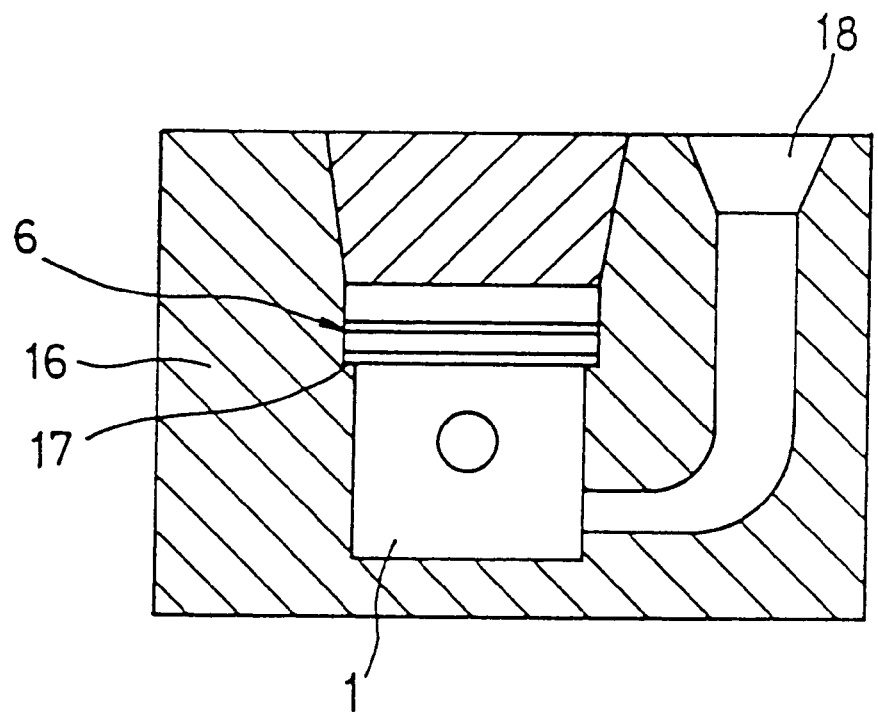
FIG. 5 is an explanatory view showing a mold for casting a piston.

At first, as shown in FIG. 5, the ringlike member 6 is disposed at a certain predetermined position in a casting mold 16 for forming the piston 1, that is, the peripheral portion 2 forming thereon the piston ring groove 3 of the piston 1. In this embodiment, the ringlike member 6 is disposed on a step portion 17 formed in the casting mold 16. Then, a melted alloy is supplied into the casting mold 16 through a gate 18. With this, the piston 1 is cast, and at the same time the ringlike member 6 is enclosed by the melted alloy (the first step).

Figure 6:
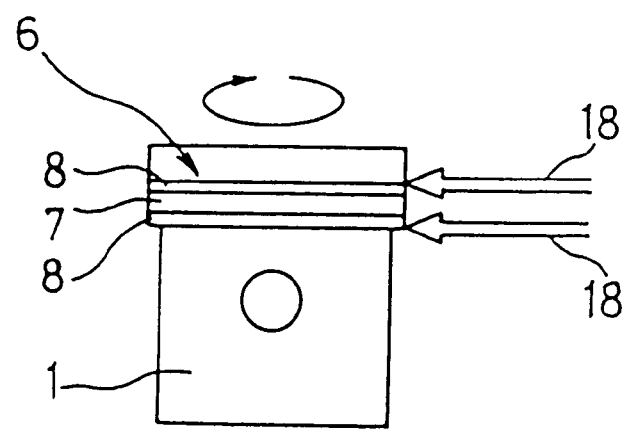
FIG. 6 is an explanatory view showing a condition of the electron beam irradiation.

The piston having the ringlike member enclosed by the melted alloy is taken out of the casting mold 16. Then, as shown in FIG. 6, it is irradiated with the electron beam 18 in a vacuum atmosphere. With this, the aluminum alloy material 8 of the ringlike member 6 and the piston 1 are melted locally at their bonded portion, and thus the ringlike member 6 and the piston 1 are bonded together into a monolithic body (the second step).

As shown in FIG. 6, the electron beam irradiation is conducted, while the piston 1 is rotated at a slow speed. Therefore, the melted portion is rapidly cooled down by the base material of the piston 1 after the irradiation with the electron beam 18, that is, after the passage of the electron beam 18.

After that, an outer shape of the piston 1 is formed, and as shown in FIG. 1, the piston ring groove 3 is formed on the copper alloy material portion 7 of the ringlike member 6 (the third step).

With this, there is obtained a piston 1 for internal-combustion engine which is capable of forming a piston ring groove superior in abrasion resistance, without having adhesion of the hardened layer forming thereon the piston ring groove 3, that is, the copper alloy material portion 7 of the ringlike member 6 in this embodiment, to the piston ring, and without having cracks on the copper alloy material 7.

EMBODIMENT

Good results were obtained by adopting the following concrete structure of the ringlike member 6.

(1) An aluminum bronze material having a texture where an aluminum-copper intermetallic compound is dispersed in a copper base was used as the copper alloy material 7, and an aluminum alloy extensible material 4032 was used as the aluminum alloy material 8.

In fact, aluminum alloy extensible materials 4032 according to Japanese Industrial Standard were disposed on both sides of the aluminum bronze material. The blank material 9 under this condition was heated at about 600° C. and furthermore pressurized at a pressure from about 600 to 700 MPa.

Then, the ringlike member 6 was formed from the blank material 9.

(2) A composite material formed from a powder compact was used as the copper alloy material 7, and an aluminum alloy extensible material 4032 according to Japanese Industrial Standard was used as the aluminum alloy material 8.

In fact, a composite material was formed by forging a powder compact prepared by adding 10–15 wt % of silicon carbide and 15–20 wt % of aluminum bronze to a binder powder of silicon and aluminum, with the addition of pressure. The content (wt %) of the binder powder of silicon and aluminum is relatively defined, relative to the weight percentage of silicon carbide and aluminum bronze of the above-mentioned certain predetermined range, and the total is defined as being 100 wt %. Then, the aluminum alloy extensible materials 4032 according to Japanese Industrial Standard were disposed on both sides of the composite material as the copper alloy material 7, and the blank material 9 under this condition was heated at about 600° C., and furthermore pressurized at a pressure from about 600 to 700 MPa.

Then, the ringlike member 6 was formed from the blank material 9.

According to the present invention, it is possible to form a piston ring groove superior in abrasion resistance, without having adhesion of the hardened layer having the piston ring groove formed thereon, that is, the copper or iron alloy material of the ringlike member, to a piston ring, and without having cracks on the hardened layer. Therefore, it is possible to obtain an internal-combustion engine's piston having a superior durability.

INDUSTRIAL APPLICABILITY

As mentioned hereinabove, an internal-combustion engine's piston and a method for producing the same according to the present invention are not limited to the above-mentioned embodiment. For example, the copper alloy material of the ringlike member may be replaced with an iron alloy material. Furthermore, it can surely be applied to an internal-combustion engine's piston for watercraft and the like, as well as that for automobile.

What is claimed is:

1. A piston for an internal-combustion engine, which is characterized in that a ringlike member of a three-layer structure having aluminum alloy materials disposed on both sides of a copper alloy material has been embedded in a peripheral portion forming thereon a piston ring groove of an aluminum alloy piston, that a remelting portion has been formed at a bonded portion between said aluminum alloy material of this ringlike member and the piston, thereby to bond together the ringlike member and the piston monolithically, and that the piston ring groove has been formed on the copper alloy material of the ringlike material.

2. A piston for an internal-combustion engine according to claim 1, which is characterized in that the copper alloy material of the ringlike member is made of an aluminum bronze material.

3. A piston for an internal-combustion engine according to claim 1, which is characterized in that the copper alloy material of the ringlike member is a composite material formed from a powder compact prepared by adding 10–15 wt % of silicon carbide and 15–20 wt % of aluminum bronze to a binder powder of silicon and aluminum.

4. A piston for an internal-combustion engine according to claim 1, which is characterized in that the copper alloy material and the aluminum alloy material have been heated at a certain predetermined temperature and pressurized at a certain predetermined pressure such that there is a metal bond between the copper alloy material and the aluminum alloy material.

5. A method for producing a piston of an internal-combustion engine, said method comprising:

a first step of casting a piston made of an aluminum alloy in a manner to enclose a ringlike member of a three-layer structure having aluminum alloy materials disposed on both sides of a copper alloy material, at a piston's peripheral portion forming thereon piston ring grooves;

a second step of monolithically bonding the ringlike member and the piston together by a local remelting of the aluminum alloy material of this ringlike member and the piston at a bonded portion thereof; and a third step of forming a piston ring groove on the copper alloy material of the ringlike member.

6. A method for producing a piston of an internal-combustion engine according to claim 5, which is characterized in that the local remelting of the aluminum alloy material of the ringlike member and the piston base material at the bonded portion is carried out by an electron beam irradiation in a vacuum atmosphere.

7. A method for producing a piston of an internal-combustion engine according to claim 5, which is characterized in that the local remelting of the aluminum alloy material of the ringlike member and the piston base material at the bonded portion is carried out by a laser beam irradiation in the atmosphere.

* * * * *